United States Patent

[11] 3,584,199

[72] Inventor John F. Taplin
5 Sewall Street, West Newton, Mass. 02168
[21] Appl. No. 822,256
[22] Filed May 6, 1969
[45] Patented June 8, 1971

[54] PROCESSOR FOR RECORDING SYMBOLS PROVIDED ON CURVED SURFACE ELEMENTS
9 Claims, 3 Drawing Figs.

[52] U.S. Cl. .......... 235/61.11, 235/61.11
[51] Int. Cl. .......... G06k 9/04
[50] Field of Search .......... 235/61.11, 61.114, 61.113, 61.115

[56] References Cited
UNITED STATES PATENTS
3,503,265 3/1970 Isreeli .......... 235/61.11X

*Primary Examiner*—Daryl W. Cook
*Attorney*—Erwin Salzer

ABSTRACT: A device for automatically recording data pertinent to the contents of substantially cylindrical articles such as, for instance, test tubes, or bottles, includes an endless revolving conveyor for transporting such articles, fixed rotary drive means for sequentially imparting a rotary motion to each of a plurality of such articles about the axis of curvature of one curved surface element thereof and a fixed, preferably magnetic, readout head. If the readout head is magnetic its sensing gap is arranged in a common plane with the aforementioned axis of curvature.

Inventor:
John F. Taplin,
by
Attorney

Inventor:
John F. Taplin,
by [signature]
Attorney

PROCESSOR FOR RECORDING SYMBOLS PROVIDED ON CURVED SURFACE ELEMENTS

BACKGROUND OF INVENTION

There are many instances where it is necessary, or desirable, to automatically read information which is written in one form or another on the surface of containers that have curved surface elements whose radii of curvature are invariant, and equal, and to record such information by feeding it into a memory device such as, for instance, a magnetic tape recorder. Such an operation is, for instance, of major importance in the operation of hospitals in connection with the analysis of blood samples where information written on the surface of test tubes containing blood samples, known as pilot tubes, must be read off and recorded. Since the number of such pilot tubes to be processed is often very large, it is desirable to provide means which perform the above operation entirely automatically, and as rapidly as possible. Another reason for performing the above operation entirely automatically is the exclusion of human error which may have fatal results in the instance of reading information from pilot tubes containing blood samples, and of recording such information.

A similar problem calling for automated means for reading information and recording the same is taking inventories of goods contained in identical bottles, or to typing out packing lists of substances to be shipped in identical bottles.

The processor according to this invention fills the need for performing the aforementioned operations entirely automatically.

SUMMARY OF INVENTION

A processor according to this invention includes an endless conveyor means having a plurality of equidistantly spaced identical carrier means for transporting a plurality of articles that have curved surface elements whose radii of curvature are invariant and equal. Since all of said plurality of carrier means are identical, each of them is adapted to engage each of said plurality of articles in the same way so that the spatial relations between each of said plurality of carrier means and each of said plurality of articles are invariant. The aforementioned conveyor means is operated intermittently by drive means establishing periods during which said conveyor means stand still. The processor is further provided with an additional stationary rotary drive means including a motor means arranged at a point along the periphery of said conveyor means which point is the readout station of the processor. The aforementioned additional stationary rotary drive means is adapted to impart a rotary motion to each of said plurality of articles about said axis of curvature of said curved surface elements thereof. The processor further includes a stationary readout head having a sensing means arranged to successively read increments of said curved surface elements of said plurality of articles during said periods when said conveyor means stand still and said additional stationary rotary drive means impart a rotary motion to said articles relative to said conveyor means.

DESCRIPTION OF PREFERRED EMBODIMENT

Figure 2:
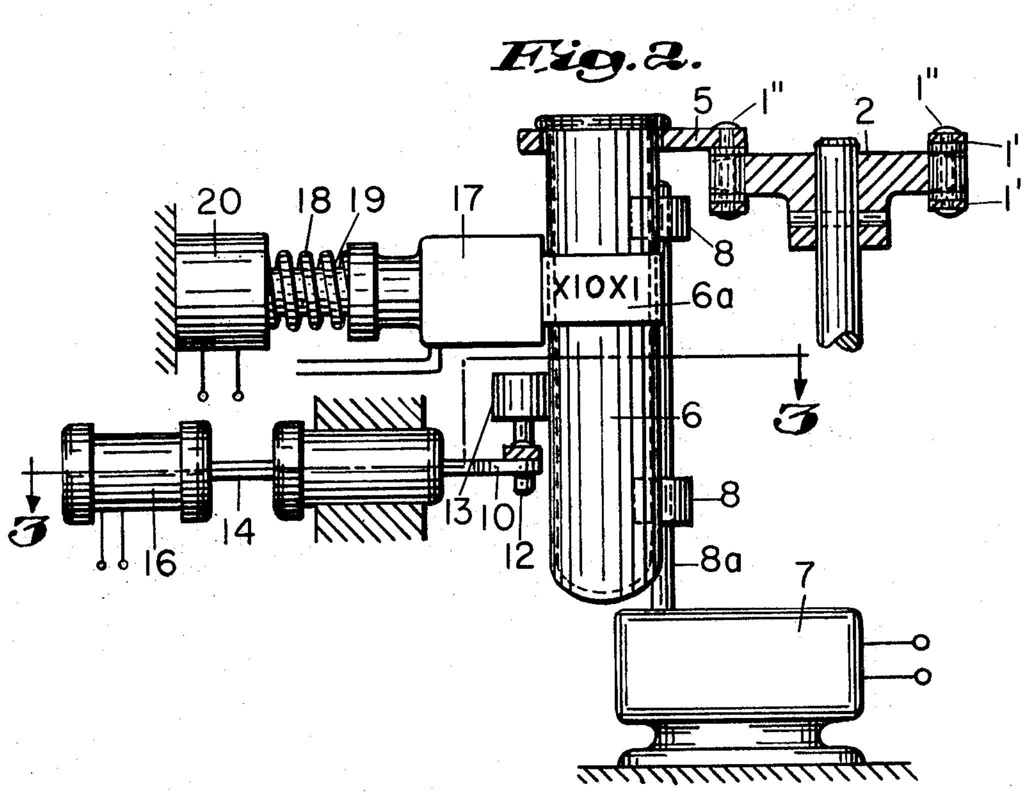
FIG. 2 is substantially a section taken along 2–2 of FIG. 1, but some of the parts of FIG. 2 are shown in side elevation rather than in section.
Figure 3:
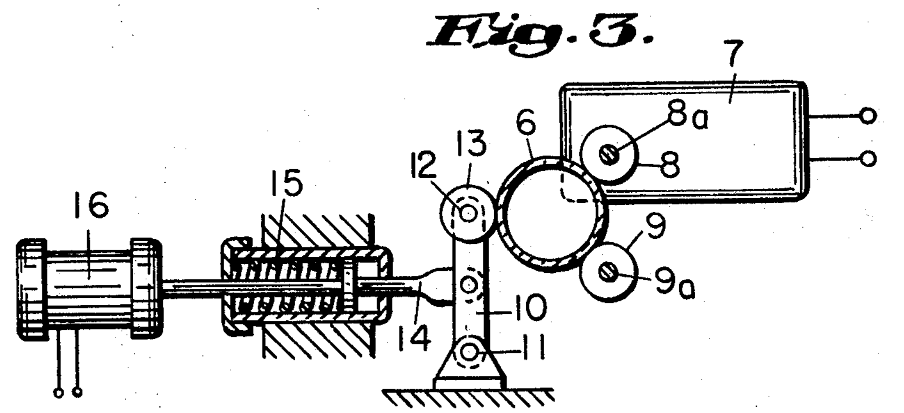
FIG. 3 is a section along 3–3 of FIG. 2.

In the drawings numeral 1 has been applied to generally indicate an endless conveyor means. Endless conveyor means 1 is preferably in the form of a link chain made up of link elements 1′ pivotally joined together by transverse pins 1″. Link chain 1 is mounted on a pair of sprocket wheels 2,3. Sprocket wheel 3 is intermittently driven by an electric motor diagrammatically indicated at 4. Motor 4 establishes periods during which conveyor 1 revolves, alternating with periods during which conveyor 1 is at rest, or stands still. Numeral 5 has been applied to indicate a plurality of identical carriers spaced equidistantly along conveyor 1. One portion of carriers 5 forms link elements of chain conveyor 1, and another portion of carriers 5 forms annular members. Carriers 5 are connected by transverse pins 1″ to the constituent link elements 1′ of chain conveyor 1. As best shown in FIG. 2 each of the carrier means 5 has a circular central aperture and is thus adapted to support a pilot tube, or test tube, 6. Such tubes 6 have curved surfaces, or curved surface elements, whose radii of curvature are invariant and equal. If all carrier or carrier means 5 are identical, and all test tubes 6 are identical, each of a plurality of test tubes is supported in the same way by one of the carriers 5, i.e. the spatial relation between each of said plurality of carriers 5 and each of a plurality of test tubes 6 supported by the former is invariant. Numeral 7 has been applied to indicate a fixed or stationary electric motor arranged at a predetermined point along the periphery, or trajectory, of conveyor 1. Motor 7 operates drive shaft **8*a* supporting a pair of axially spaced rubber rollers 8. Shaft 9*a* is arranged parallel to shaft 8*a* and supports a pair of axially spaced rubber rollers 9. A lever 10 pivotally mounted at 11 supports on its end remote from pivot 11 a pin 12 on which a rubber roller 13 is rotatably mounted. Lever 10 and roller 13 are biased in clockwise direction, as seen in FIG. 3, by means of lever 14 and helical spring 15. Thus roller 12 tends to push test tube 6 from left to right, as seen in FIG. 3, into firm engagement with rollers 8 and 9. It will be apparent from the above that roller 8 is a drive roller or capstan and that rollers 9 and 13 are idlers. Spring 15 acts on a piston integral with lever or piston rod 14, and the latter is acted upon by a solenoid 16. As long as solenoid 16 is deenergized, test tube 6 and roller 13 are maintained in their vertical positions shown in FIGS. 2 and 3 by the action of spring 15 and of rollers 8,9 and 13. When solenoid 16 is energized, piston rod 14 and roller 13 are moved from right to left, as seen in FIGS. 2 and 3, against the bias of spring 15. In the limit position of parts 10, 13,14 shown in FIGS. 2 and 3 test tube 6 is firmly clamped between rollers 8,9,13. In the other limit position of parts 10,13,14 the conveyor 1 may be allowed to revolve. There is sufficient clearance between the circular test-tube-receiving apertures in carriers 5 and cylindrical test tubes 6 to allow the latter to tilt from their vertical position shown in FIG. 2 and thus to move out of the way of rollers or capstans 8 on stationary shaft 8*a* and thus to resume their travel whose direction is indicated by a pair of arrows adjacent to sprocket wheels 2,3**.

Before any of pilot tubes or test tubes 6 reaches its position shown in FIGS. 2 and 3 rollers 9 interfere with its trajectory and cause a tilting motion of pilot tubes or test tubes 6 relative to their horizontal carriers 5. This tilting motion takes place on account of the clearance between carriers and tubes 6 and because solenoid 16 is energized at the time tubes 6 reach the readout station.

Test tubes 6 support on the outer surface thereof labels **6*a* with information in alphanumeric form. This information is preferably printed with magnetizable ink and the reverse side of labels 6*a* is coated with a pressure sensitive adhesive, to allow labels 6*a* to be readily affixed to the outer surface of test tubes 6**.

Reference numeral 17 has been applied to indicate a character recognition head, or readout head, e.g. a magnetic readout head, acted upon by helical spring 18. Spring 18 biases reading head 17 from left to right, as seen in FIGS. 2 and 3. In the right limit position thereof readout head 17 is in close proximity to test tube 6, but does not frictionally engage the surface thereof. This may be achieved by abutment means (not shown) limiting the movement of readout head 17 by the action of spring 18 from left to right, as seen in FIGS. 2 and 3. Readout head 17 is supported by a rod 19 the left end of which (see FIGS. 2 and 3) is integral with the armature of a solenoid 20. When energized, solenoid 20 retracts readout head 17 from its right limit position shown in FIGS. 1,2 and 3, to a left limit position.

The retracting mechanism for roller 13 is mandatory since test tube 6 cannot be moved by conveyor 1 as long as it is clamped between the rollers 8,9 and 13. The retracting mechanism for readout head 17 is desirable, but not mandatory, since readout head 17 might be arranged so as never to obstruct the path of test tubes 6. If readout head 17 is a magnetic readout head, its sensing gap—which may be an airgap or a gap filled with a solid having a high reluctance—ought to be arranged in a common plane with the axis of test tube 6 and that of its carrier 5. This has been shown more in detail in my copending patent application Ser. No. 822,257 filed May 6, 1969 for SYSTEM FOR IDENTIFYING AND LABELING THE CONTENTS OF BLOOD PACKS.

Figure 1:
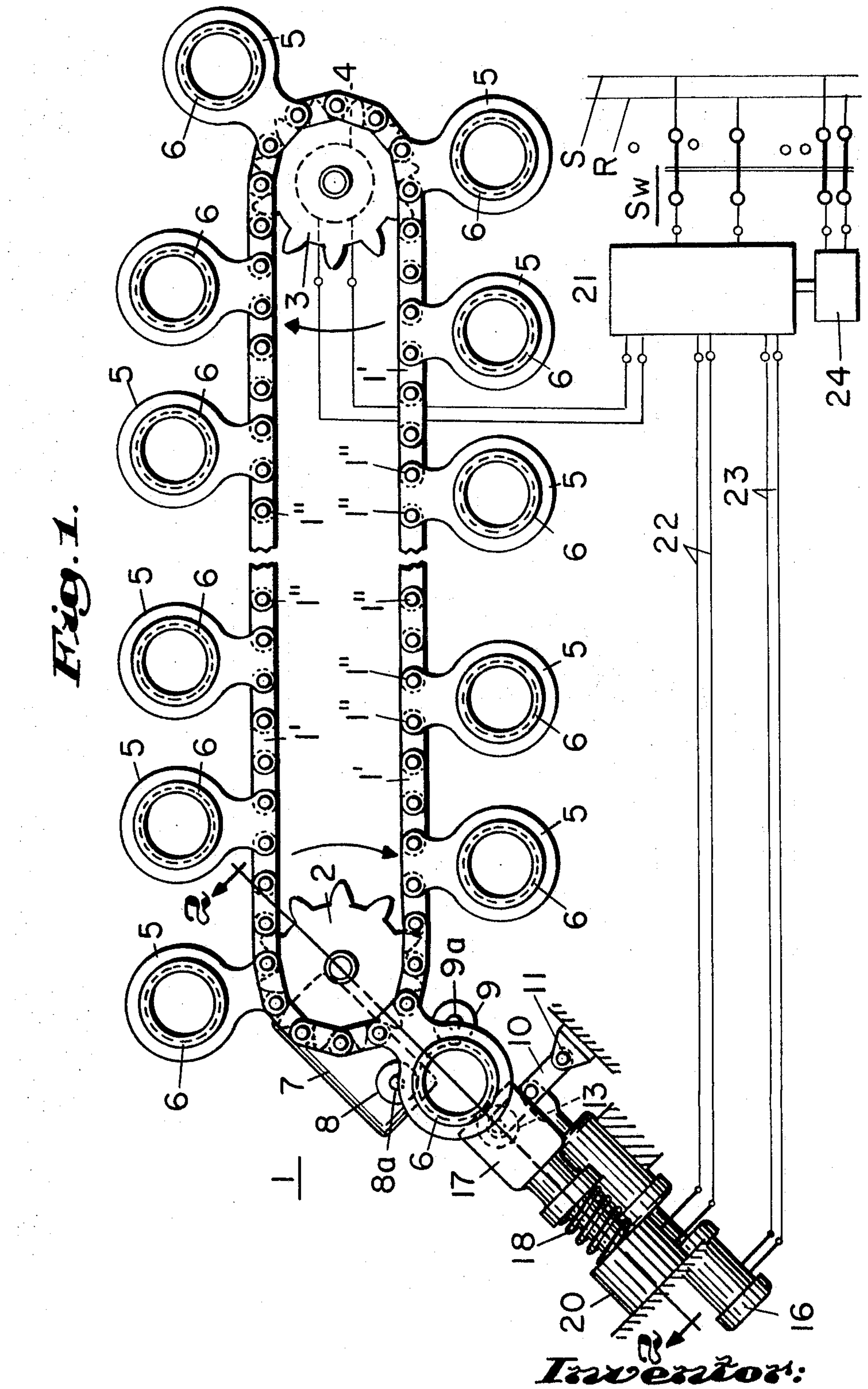
FIG. 1 is a top-plan view of a processor embodying this invention and a wiring diagram of associated control circuitry.

Referring now to FIG. 1, motor 4 is energized from an electric distribution system R,S by the intermediary of switch Sw and automatic timer 21. Timer 21 controls also the energizing circuit 22 of solenoid 20 and the energizing circuit 23 of solenoid 16. Switch Sw controls the energizing circuit of a synchronous motor 24 driving timer 21. Timer 21 may be of the type including rotatable cams closing and opening pairs of cooperating contacts at predetermined points of time. Automatic timer 21 energizes and deenergizes intermittently motor drive 4 to establish alternating periods of movement and standstill of motor drive 4. The terminals of motor 7 may be directly connected to the distribution system R,S bypassing timer 21, in which case motor 7 will operate rollers 8 during the periods of movement and during the periods of standstill of drive 4 and conveyor 1. As an alternative, the terminals of motor 7 may be connected to some special terminals (not shown) of automatic timer 21 which deenergize motor 7 during the periods of movement of drive 4 and conveyor 1, and energize motor 7 during the periods of standstill of drive 4 and conveyor 1.

When conveyor 1 revolves one of vertical test tubes 6 engages roller 9 and as a result of this engagement and of the loose fit between test tube 6 and carrier 5 the former is tilted, or slanted, and moved approximately along the plane of section 2–2 of FIG. 1. Thereupon solenoid 16 is deenergized, biasing spring 15 rendered operative and the respective test tube 6 firmly clamped between rollers 8,9 and 13. As soon as sufficient friction has been established between drive rollers or capstans 8 and test tube 6, the latter begins to revolve about its longitudinal axis, While roller 13 is moved under the bias of spring 15 to its clamping position, readout head 17 is moved under the bias of its spring 18 to its readout position in close proximity to test tube 6. When readout head 17 has read all of the information on label *6a* solenoids 16 and 20 are energized, retracting roller 13 and readout head 17 from test tube 6. Motor drive 4 is energized causing conveyor 1 to resume its motion and causing test tube 6 to be tilted so as to avoid rollers 8 tending to obstruct its path.

The alphanumeric information on labels *6a* is preferably binary. The signal processing circuitry (not shown) associated with readout head 17 depends largely upon the nature of the latter and upon the code used for converting the information on label *6a* into corresponding electric pulses. Not all of the 360° of the circumference of a test tube are needed for information purposes. Hence labels *6a* may readily include start signals and stop signals for the storage of information in a memory device. A delay means may be interposed in the signal transmission means to take account of the pauses occurring between successive readouts.

I claim as my invention:

1. A processor for recording symbols provided on surface elements having equal and invariant radii of curvature including a. an endless conveyor means having a plurality of equidistantly spaced identical carrier means each for transporting one of a plurality of articles having curved surface elements whose radii of curvature are invariant and equal, each of said plurality of carrier means being adapted by virtue of its identity with all others of said plurality of carrier means to engage each of said plurality of articles in the same way so that the spatial relation between each of said plurality of carrier means and each of said plurality of articles is invariant;

b. conveyor drive means for intermittently operating said conveyor means establishing periods during which said conveyor means revolves alternating with periods during which said conveyor means stands still;

c. additional drive means operative during said periods when said conveyor means stand still for imparting a rotary motion relative to said conveyor means to articles supported by said carrier means about the axis of curvature of said curved surface elements of said articles, said additional drive means including stationary motor means and stationary article-engaging roller means driven by said motor means; and d. a readout head having sensing means arranged to successively read increments of said curved surface elements of said plurality of articles during said periods when said conveyor means stand still and said additional drive means impart a rotary motion to said articles relative to said conveyor means.

2. A processor as specified in claim 1 wherein said endless conveyor means is a chain formed of links and transverse pins and mounted on a pair of sprocket wheels, and wherein said plurality of carriers are substantially annular each having a lateral extension secured to said chain.

3. A processor as specified in claim 1 wherein said additional drive means include three roller-supporting shafts arranged to form a circular pattern around one of said plurality of articles, said three shafts including one shaft driven by said fixed motor means, and another shaft arranged to move radially inwardly under the bias of spring means acting upon said another shaft and to be moved radially outwardly against the bias of said spring means by a shaft-retracting motor means.

4. A processor as specified in claim 1 wherein said readout head is provided with motor means for moving said readout head selectively away from said conveyor means and toward said conveyor means.

5. A processor as specified in claim 1 wherein said fixed readout head is a magnetic readout head having a sensing gap arranged in a common plane with said axis of curvature of said curved surface elements as determined by said invariant spatial relation between each of said plurality of carriers and each of said plurality of articles.

6. A processor for recording symbols provided on surface elements having invariant radii of curvature including a. an endless conveyor means having a plurality of equidistantly spaced carrier means;

b. a motor drive for operating said conveyor means to cause said conveyor means to revolve;

c. an automatic timer intermittently energizing and deenergizing said motor drive to establish alternating periods of movement and standstill of said motor drive and of said conveyor means;

d. a character recognition readout head arranged at a predetermined point along the path of said conveyor means; and e. additional drive means for rotating articles supported by said endless conveyor means relative to said conveyor means during said periods of standstill of said motor drive, said additional drive means including a stationary motor, roller means for engaging said articles operated by said stationary motor, and additional roller means for engaging said articles, said additional roller means including at least one roller under the control of roller moving means for selectively moving said one roller to two limit positions thereof, said roller moving means being under the control of said automatic timer to cause moving of said one roller to one of said limit positions thereof during said periods of movement of said motor drive and to cause moving of said one roller to the other of said limit positions thereof during said periods of standstill of said motor drive.

7. A processor as specified in claim 6 wherein said readout head and said additional drive means are arranged at substantially the same location along said path of said conveyor means, and wherein said readout head is supported by readout-head-moving-means for selectively moving said readout head to two limit positions thereof, said readout-head-moving-means being under the control of said automatic timer to cause moving of said readout head to one of said limit positions thereof during said periods of movement of said motor drive and to cause moving of said readout head to the other of said limit positions thereof during said periods of standstill of said motor drive.

8. A processor for recording symbols provided on surface elements having invariant radii of curvature including a. a horizontal endless conveyor means having a plurality of equidistantly spaced carriers each defining a circular test-tube-receiving aperture;

b. a plurality of normally substantially vertical test tubes each loosely fitted into said circular aperture of, and supported by, and tiltable relative to, one of said plurality of carriers;

c. a motor drive for operating said conveyor means to cause said conveyor means to revolve;

d. a vertical roller means arranged in the path of said plurality of test tubes when jointly revolving with said conveyor means;

e. an automatic timer intermittently energizing and deenergizing said motor drive to establish alternating periods of movement and standstill of said motor drive and said conveyor means;

f. a stationary motor energized during said periods of standstill to operate said vertical roller means and to cause said vertical roller means to impart a rotary motion to one of said plurality of test tubes during said periods of standstill;

g. idler roller means for engaging the lateral walls of said plurality of test tubes, said idler roller means including at least an idler roller biased against the lateral wall of one of said plurality of test tubes during said periods of standstill;

h. automatic means for retracting said idler roller during said periods of movement; and i. a magnetic readout head arranged in close proximity to the lateral wall of each of said plurality of test tubes during said periods of standstill.

9. A processor as specified in claim 8 including automatic means for retracting said magnetic readout head during said periods of motion.